3,206,449
DETECTION AND MEASUREMENT OF ORGANIC VAPORS AND GASES
Frank W. Van Luik, Jr., Schenectady, N.Y., assignor to General Electric Company, a corporation of New York
Filed Sept. 30, 1960, Ser. No. 59,720
2 Claims. (Cl. 260—95)

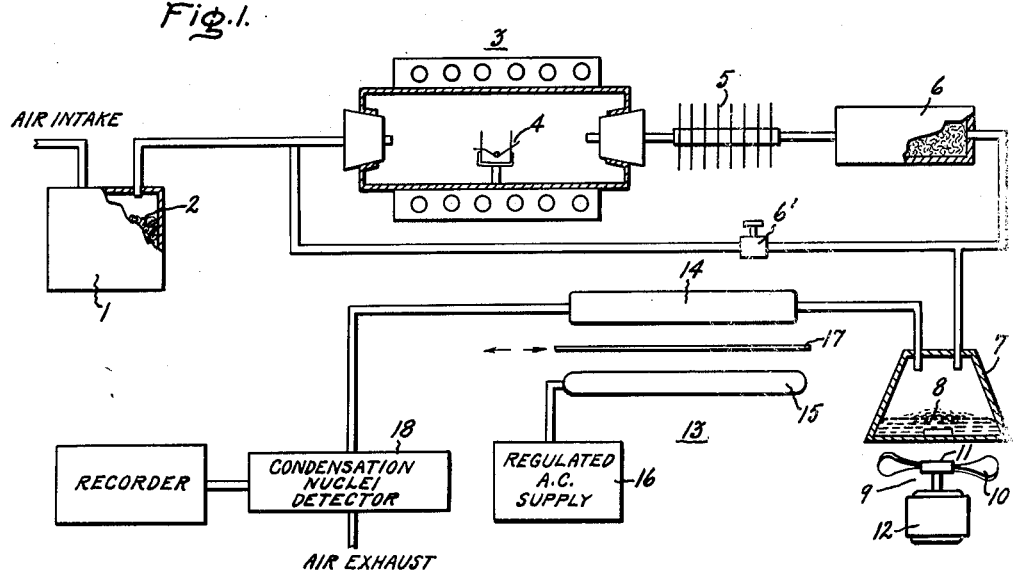
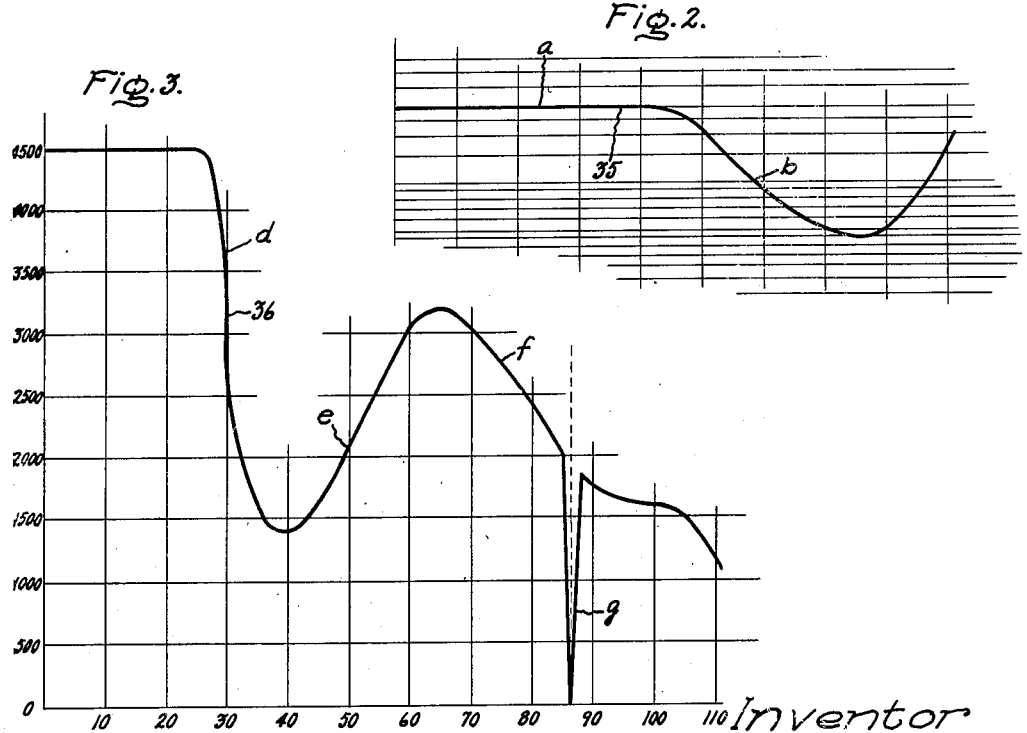

This invention relates to a method and apparatus for measuring and detecting organic vapors and gases. More particularly, the invention relates to a method and apparatus for measuring and detecting certain organic solvents in an atmosphere or flowing gas stream by converting the same into airborne particulates and determining the concentration of these particulates as a measure of the gas or vapor concentration.

The term "airborne particulate," as utilized in the instant application, is intended to encompass both solid or liquid particles as well as molecular aggregates of a vapor which are suspended in a carrier.

Recent investigations have shown that extremely low concentrations, on the order of several parts per million, of certain types of organic gases and vapors, such as the unsaturated hydrocarbon cyclohexene, for example, may be detected by converting the gas or vapor into small airborne particulates. The particulates are nucleogenic in that they are capable of functioning as condensation nuclei and are detected by known highly sensitive condensation nuclei measuring techniques. One mechanism for converting these unsaturated hydrocarbon gases and vapors into the desired particulate form is photochemical in nature; i.e., conversion takes place by subjecting the hydrocarbon vapors and gases to ultraviolet radiation in the presence of a minute quantity of mercury vapor. A method and apparatus for the photochemical conversion of certain hydrocarbon vapors is described and claimed in application Serial No. 59,719, now U.S. Patent 3,102,192, filed concurrently with the instant application, in the name of George F. Skala, which patent is assigned to the assignee of the present invention.

The term "condensation nuclei," as utilized in this specification, is a generic term applied to those small airborne particulates which are characterized by the fact that they serve as the nuclei on which a fluid, such as water, for example, may condense to form droplets. Condensation nuclei, as the term is understood in the art, encompass particles ranging in size from $1 \times 10^{-4}$ centimeter radius to $1 \times 10^{-8}$ centimeter radius, although the most significant portion numerically of this range lies between $5 \times 10^{-5}$ and $5 \times 10^{-7}$ centimeter radius.

In addition to detecting unsaturated hydrocarbons, certain classes of organic gases and vapors may also be detected by a similar though different technique. It has been found that organic solvents, such as the aromatic hydrocarbon solvents as exemplified by toluene, naphtha, and benzene, alcohol solvents as exemplified by ethyl-alcohol, methyl-alcohol and acetone, and aliphatic hydrocarbon solvents as exemplified by the aliphatic solvent marketed under the trade designations "Solvesso 100" and "Solvesso 150," may be detected and measured by their ability to inhibit the formation of particulates of the condensation nuclei type in other gases or vapors. Certain vapors, such as mercury, for example, when exposed to ultraviolet radiation, are easily converted by a photochemical process to airborne particulates which act as condensation nuclei. However, the conversion of mercury (Hg) vapor to particulates is inhibited by the presence of organic solvents to a degree which is a function of the solvent concentration. It will be appreciated, therefore, that this inhibiting property of the solvents makes it possible to detect many of these organic solvents.

It is, therefore, an object of this invention to provide a method and apparatus for detecting organic solvents.

A further object of this invention is to provide a method and apparatus for detecting and measuring the concentration of organic solvents by the inhibiting action of these solvents.

Still another object of this invention is to provide a method and apparatus for detecting and measuring the concentration of organic solvents which have a fast response time and which are sensitive to low concentrations of the solvent.

Another object is to provide a method and apparatus for detecting and measuring the concentration of organic solvents which provide an electrical output which is a function of the vapor concentration.

Other objects and advantages of the invention will become apparent as the description thereof proceeds.

The foregoing objects and advantages of this invention are accomplished and the invention practised by exposing mercury vapor to ultraviolet radiation to form airborne particulates and establish an ambient concentration level. Air samples suspected of containing the organic solvent being detected are then exposed to the radiation in the presence of mercury. If organic solvents are present in the air sample they inhibit the formation of the airborne particulates from the mercury vapor, and the particle concentration is reduced by an amount proportional to the solvent concentration.

The features of this invention which are believed to be novel are set forth with particularity in the appended claims. The invention itself, however, both as to its organization and method of operation, together with further objects and advantages thereof, may best be understood by reference to the following description taken in connection with the accompanying drawing, in which:

FIG. 1 is a schematic illustration of a device for detecting and measuring organic solvents, and FIGS. 2 and 3 are graphs showing the relationship of particle concentration with time.

An apparatus for practising the invention is shown generally in FIG. 1. The apparatus shown there is one for detecting an organic solvent liberated during the curing cycle of a polymeric material, such as the one designated by the trade name "Alkanex," which is disclosed in U.S. Patent No. 2,936,296, Precopio and Fox, issued May 10, 1960, the disclosure of which is incorporated herein by reference, and which, for example, may be a cross-linked polyester of ethyelne glycol, glycerine and a lower dialkyl ester of isophthalic acid or terephthalic acid or mixtures. To this end, a particle free stream of air or gas is passed through a charcoal filter 1 wherein various unwanted gases or vapors are removed by absorption on charcoal filter materials 2 contained therein. The stream flows into an electric oven, illustrated at 3, which contains a small beaker or container 4 housing the uncured polymeric material which evolves the organic solvent as it goes through its curing cycle. One physical example of a polymeric material which emits an organic solvent in the course of its curing solvent is the "Alkanex" resin mentioned above and which usually contains varying percentages of an aliphatic hydrocarbon solvent known by the trade designation "Solvesso 100" or "Solvesso 150," marketed by the Socony Mobil Corporation of New Jersey. The organic solvent liberated from the polymeric material in the container 4 is entrained in the stream passing through oven 3 and passes through a copper finned heat exchanger 5 to reduce the stream temperature. The cooled stream flows through a glass wool filter 6 to remove any particulates in the air. During calibration of the device, valve 6' is opened and the ambient air stream bypasses chamber 3 containing the organic solvent vapor. During operation valve 6' is closed, and the stream passes through chamber 4 and flows directly through a mercury vapor source which consists of glass flask 7 containing a mercury pool 8. Mercury pool 8 is continually agitated by means of a magnetic stirring and coupling mechanism 9 which comprises a fan blade 10 having a magnetic disc 11 mounted thereon. Fan blade 10 is driven by a driving source, such as the motor 12, rotating the magnetic disc. Since mercury is a conductive liquid, rotation of the magnetic disc produces eddy currents therein, stirring the mercury and continuously exposing a fresh mercury surface to the air stream passing through source 7. It has been found that in the absence of such stirring, surface oxidation of the mercury takes place and the device may not always function with the desired effectiveness. The air stream containing the organic solvent vapor absorbs mercury vapor from pool 8 and passes through a converter, shown generally at 13, where the organic solvents and mercury vapors are exposed to ultraviolet radiation. The converter comprises a quartz tube 14, through which the gas stream passes from mercury source 7. Quartz tube 14, which is pervious to ultraviolet, is positioned in a field of ultraviolet radiation produced by a low pressure mercury vapor lamp 15 which is energized from a source of regulated A.C. power 16. The low pressure mercury vapor lamp 15 produces ultraviolet radiation concentrated in the 2537 Angstrom (A.) band. A shutter, shown generally at 17, is positioned between mercury lamp 15 and the quartz tube 14 and may be selectively moved in a lateral direction to control the amount and degree of the ultraviolet radiation which impinges on the tube 14 and irradiates the gas stream.

In the absence of organic vapors in the air stream, the ultraviolet radiation from mercury lamp 15 converts the mercury to particulates by a photochemical reaction to establish an ambient level of nuclei concentration in the chamber 14 which is measured in a condensation nuclei measuring device 18 connected to the chamber. The presence of organic solvents in the air stream inhibits formation of nuclei by the photochemical conversion of the mercury and reduces the nuclei concentration to provide an indication of the presence of the solvents. The reaction by which these organic solvents inhibit the photochemical conversion of Hg is not completely understood. However, a theory of the inhibiting reaction will be set forth in detail later. At this point, it is sufficient to point out that it has been found that the presence of minute concentrations of organic solvents, on the order of 1–2 parts per million, is sufficient to reduce the particle concentration substantially.

The condensation nuclei measuring device shown at 18 is of the type which contains a humidifying device to bring the nuclei or airborne particles in the air stream to 100% relative humidity. The humidified sample is then subjected to an adiabatic expansion, by means of which the gaseous sample is subjected to a fixed pressure differential. The adiabatic expansion cools the gas stream, and by virtue of the cooling action a condition of supersaturation comes into being so that the gas sample which had previously been at 100% relative humidity is now at some higher percentile. Since the supersaturated condition is an unstable one, excess vapor begins to condense about the suspended airborne particles and forms droplets which grow rapidly in size and abstract sufficient water vapor from the sample to reduce the saturation level to 100% at the new temperature. The droplets formed by condensation of water about the airborne particles are measured by means of an electro-optical system, which includes a light scattering arrangement, by means of which the droplet concentration is determined and expressed in terms of a current flowing in an electrical output circuit, which current may be directly calibrated either in particles per cc. or in parts per million of the gas or the vapor. A condensation nuclei measuring device such as this is described in detail in U.S. Patent No. 2,684,008, issued July 20, 1954, to Bernard Vonnegut, and may be utilized with the instant system. A similar automatically operated condensation nuclei measuring device is described in an article, entitled "Cloud Chamber for Counting Nuclei in Aerosols," by Bernard G. Saunders in Review of Scientific Instruments, vol. 27, No. 5, May 1956, pages 273–277. In the condensation nuclei measuring device described in the Saunders article, supra, periodically actuated solenoid valves control the admission of the humidified samples into the device and their subsequent expansion to form droplets, which are measured either photographically or electro-optically to provide an output indication which is a measure of the particle concentration. In addition to the above described nuclei measuring devices, it will be understood by those skilled in the art that many other and different types of measuring devices may be used with equal facility in detecting and measuring the particles formed in quartz tube 14.

In operation, control valve 6' is first opened to prevent any organic solvent from passing into the rest of the instrumentality. Ultraviolet lamp 15 is energized and shutter 17 is adjusted to establish a predetermined particle conversion level which constitutes the reference or ambient level prior to the introduction of the sample solvents. To achieve adequate sensitivity and accuracy with this instrumentality, the shutter position was adjusted to produce an irradiation intensity sufficient to establish a particle concentration in excess of 30,000 particles per cc. After the ambient or reference nuclei concentration level is stabilized, the polymeric solvent mixture is introduced into the oven and the valve 6' is closed to permit any organic vapor liberated during the curing process to pass through mercury vapor source 7 and into the quartz tube 14. The liberation of any such organic solvent is manifested by a reduction in the number of particles produced in tube 14 so that the output reading or indication from the condensation nuclei measuring device 18 is reduced proportionately. Any such drop in the output indication is a sign that an organic vapor is present in the air stream and, hence, that the polymeric material is undergoing its curing cycle by emitting the organic vapor. When the curing process is terminated, the polymeric material or organic solvent is no longer emitted, terminating its inhibiting effect on the conversion of the mercury vapor and the ambient reference nuclei concentration level rises to its ambient value.

FIG. 2 illustrates, graphically, the results of a curing cycle carried out on a polymeric material, the polymeric material comprising a solvent mixture of "Alkanex" polymer, described above. The solvent in the mixture was a liquid aliphatic hydrocarbon such as that marketed under the trade name "Solvesso 100." The relative proportions of the "Alkanex" material and the organic solvent "Solvesso" were 90% by weight of the "Alkanex" material and 10% by weight of the organic solvent. In the graph of FIG. 2, condensation nuclei concentration per cc. is plotted logarithmically along the ordinate and time is plotted along the abscissa. The mercury vapor conversion by means of the ultraviolet source was adjusted to provide an essentially constant ambient condensation nuclei level of approximately 30,000 particles per cc., as indicated by the horizontal portion $a$ of the curve 35. The polymeric solvent mixture was then placed in the electric oven and the temperature raised slowly over a period of time. At a time $t=40$ minutes, the oven had reached a temperature of 124° C., at which time the presence of the solvent vapor emitted by the curing polymer inhibited a conversion, causing a reduction in particle concentration as shown by the dropping portion $b$ of the curve 35. The effect of the solvent vapor reached a maximum at 172° C., at which time the curing cycle was almost completed and gradually diminished as the vapor was evolved. Upon reaching a temperature of 220° C., at a time $t=90$ minutes, the condensation nuclei particle concentration had returned to approximately its original level of 30,000 particles per cc., indicating that the curing cycle had terminated.

FIG. 3 illustrates graphically a similar test where the detection sensitivity has been changed by a lower level of mercury conversion due to the manipulation of shutter 17 to control the amount of ultraviolet radiation falling on the quartz tube 14. In FIG. 3, where the particle concentration in nuclei per cc. is also plotted logarithmically along the ordinate and time along the abscissa, the ambient or reference level of particles by the photo-chemical conversion of the mercury vapor was maintained at 4,500 particles per cc. Again, a polymer solvent mixture of 90% by weight "Alkanex" material and 10% by weight of an aliphatic hydrocarbon solvent of the type known by the trade designation "Solvesso 100" was placed in the electric oven and slowly heated. When the oven reached a temperature of approximately 40° C. at a time $t=25$ minutes, the solvent was evolved, causing a reduction in the nuclei conversion as indicated by the falling portion $d$ of curve 36. When the oven temperature reached 100° C., a maximum inhibiting effect was noted, the particle concentration dropping to approximately 1,400 particles for cc. from the original reference level of 4,500. At this point, the temperature was not permitted to increase further, but was held at just below 100° C. It was noted that by maintaining the temperature at 100° C. or below, the amount of solvent being liberated started to decrease, as indicated by an increase in the particle concentration as shown by the portion $e$ of the curve 36. The oven temperature was then increased to a temperature between 100° C. and 125° C., producing a further liberation of solvent from the polymeric solvent mixture, indicating that further curing took place as the temperature was increased above 125° C. As a result of this further liberation of solvents, the inhibiting effect of the organic solvent on the mercury vapor conversion was again manifested and shown by the dropping in particle concentration, as shown by the descending portion $f$ of the curve 36. One hour and 25 minutes after intial operation, the ultraviolet light source was de-energized, terminating the irradiation of the gas stream by the ultraviolet light as shown by the sharp downwardly peaking portion $g$ of the curve. With termination of the ultraviolet irradiation, the conversion of the mercury vapor was stopped completely, and the particle concentration dropped to zero since filter 6 had removed all particles in the air stream. Very shortly thereafter, at a time $t=86$ minutes, the ultraviolet converter was re-energized, and the particle concentration rose to its previous level and then proceeded to fall because of the additional liberation of solvent from the solution.

It will be understood, of course, that the method and apparatus of this invention are not limited to detecting the curing of a polymeric material by detecting the evolution of an organic solvent from the polymer. It is obvious that under many other circumstances it may be desirable to detect and measure organic solvent vapors present in the air, irrespective of the source of these vapors.

Although the manner in which the organic solvents inhibit the mercury vapor conversion is not completely understood, the following hypothesis is set forth without in any way limiting the invention thereto. It is believed that the mercury vapor is activated when irradiated by ultraviolet light, since the absorption of the mercury vapor is high for the spectral line of its own emission, which is predominant in the mercury ultraviolet light source used. The activated mercury molecules react with water vapor present in the air stream to form nucleogenic particles such as mercuric oxide. Thus, in the absence of any of the organic solvents, large quantities of this nucleogenic compound are produced. When organic solvents are present in the gas stream, it is believed that the activated mercury atoms react with the solvent and that this reaction of the mercury atoms with the solvent does not produce a nucleogenic substance. Since the reaction of the activated mercury atoms with the solvent is competitive with the reaction of the activated mercury with water, the result is a reduction in the number of nuclei produced. The amount of the reduction is proportional to the amount of the organic solvent present which competes with the reaction with water vapor.

In addition to the aliphatic hydrocarbons such as those marketed under the trade name of "Solvesso 100" and "Solvesso 150," it has been found that certain other types of hydrocarbon solvents exhibit the same inhibiting effect on the photochemical reaction of mercury vapor with ultraviolet light and, hence, may be detected by the identical mechanism. Aromatic hydrocarbon solvents, examples of which are toluene ($C_6H_5CH_3$), benzene ($C_6H_6$), naphtha ($C_{10}H_8$), xylene ($C_6H_4(CH_3)_2$), also known as dimethylbenzenes, and alcohols, examples of which are ethyl-alcohol ($C_2H_5OH$) and methyl-alcohol ($CH_3OH$), may be detected in this manner. In addition, certain ketones which are derivatives of secondary alcohols, an example of which is acetone ($CH_3COCH_3$), exhibit this inhibiting effect on the mercury vapor photochemical conversion and, hence, may be detected by means of the novel method and apparatus disclosed in the instant application.

From the foregoing, it can be seen that a novel method and apparatus for detecting certain classes of organic hydrocarbon solvents have been disclosed which utilize and take advantage of the characteristic of these solvents of inhibiting the photochemical conversion of mercury vapor to airborne particulates. My method and apparatus give fast response time of the order of 1–2 seconds and are sensitive to low concentrations of such solvents.

An important advantage of my method and apparatus is that they do not rely upon inexact phenomena, such as color change, but instead provide a precise electrical output which is a function of the concentration of the solvent.

While a particular embodiment of this invention has been shown, it will, of course, be understood that it is not limited thereto since many modifications, both in the circuit arrangement and in the instrumentality employed, may be made. It is contemplated by the attendant claims to cover any such modifications as fall within the true spirit and scope of this invention.

What I claim as new and desire to secure by Letters Patent of the United States is:

1. The method of measuring organic solvents in an atmosphere comprising exposing mercury vapor to ultraviolet light to form airborne mercury particulates, measuring the concentration of such particulates, mixing a sample of the atmosphere containing organic solvent vapor to be measured with the mercury vapor, exposing said mixture to ultraviolet light to form airborne mercury particulates, and measuring the concentration of particulates of the mixture whereby the concentration of organic solvents in the atmosphere is indicated by a lowering of the concentration of particulates and the concentration of the organic solvents in the atmosphere is inversely proportional to the difference in the two measurements.

2. In the process of curing a polymeric material having an organic solvent therein, the curing being accompanied by the release of the organic solvent in vapor form until the cure is complete whereupon the release of solvent vapors ceases, the steps comprising passing a flow of air over the material during the curing cycle, mixing the air and solvent vapor released from the polymeric material with mercury vapor, exposing the combined air and mercury vapor to ultraviolet radiation, and measuring the concentration of airborne mercury particles in the resultant mixture whereby completion of the curing cycle and cessation of release of solvent vapor is indicated by an increase in the number of airborne particles.

References Cited by the Examiner

UNITED STATES PATENTS

| | | | |
|---|---|---|---|
| 1,844,421 | 2/32 | Brittolph | 250—43 |
| 2,755,388 | 7/56 | Weisz | 250—43.5 |
| 2,774,652 | 12/56 | Vonnegert | 88—14 |
| 2,830,016 | 4/58 | Cier et al. | 250—43 |
| 2,876,357 | 3/59 | Waters | 250—43.5 |
| 2,897,059 | 7/59 | Van Luik | 23—232 |
| 2,901,466 | 8/59 | Kibler et al. | 260—75 |
| 2,901,625 | 8/59 | Friedman et al. | 250—43.5 |
| 2,951,827 | 9/60 | Siggel | 260—75 |
| 3,102,192 | 8/63 | Skala | 250—43.5 |

JOSEPH L. SCHOFER, *Primary Examiner.*

MILTON STERMAN, HAROLD N. BURSTEIN, *Examiners.*